Aug. 10, 1943.  J. ACOSTA  2,326,598

FUEL ECONOMIZER

Filed May 13, 1941

INVENTOR
JOHN ACOSTA

BY Theodore L. Simonton
ATTORNEY

Patented Aug. 10, 1943

2,326,598

UNITED STATES PATENT OFFICE 2,326,598

FUEL ECONOMIZER

John Acosta, Syracuse, N. Y., assignor of one-half to M. J. Cook, Syracuse, N. Y.

Application May 13, 1941, Serial No. 393,213

4 Claims. (Cl. 48—180)

This invention relates to an auxiliary fuel economizer for internal combustion engines and more specifically to a mechanism for controlling the ratio of air and gasoline in the fuel mixture supplied to the engine.

The principal object of my invention is to produce a simple and efficacious means for improving the combustibility of the gaseous fuel supplied to an internal combustion engine whereby an economy in fuel consumption and longevity of the engine are effected by increasing the power of the engine and by decreasing the formation of carbon.

A more specific object of my invention is to provide an auxiliary air intake device adapted to so introduce pure air into the fuel leaving the carburetor that a greater pulverization or breaking up of the particles of the gasoline or other fuel and a more thorough mixing of the air and fuel are obtained to thereby increase the combustible properties of the fuel mixture.

These and other objects pertaining to the form and relation of the parts of my device will more fully appear from the following description taken in conjunction with the accompanying drawing in which.

Figure 1:
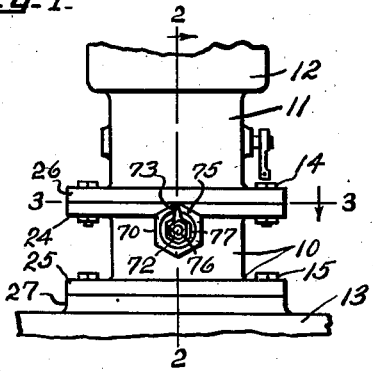
Figure 1 is a fragmentary elevational view illustrating portions of a carburetor of the down draft type, an intake manifold for an internal combustion engine and an auxiliary fuel economizer embodying the various features of my invention operatively connected between the carburetor and manifold.
Figure 2:
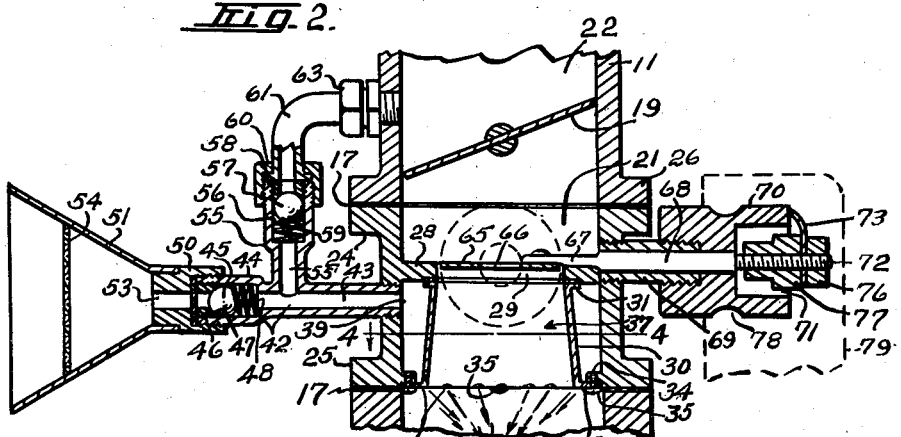
Figure 2 is a vertical sectional view on an enlarged scale taken substantially on line 2—2 of Figure 1.
Figure 4:
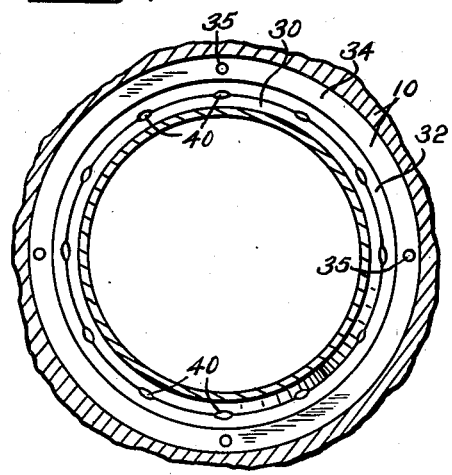
Figure 4 is a horizontal sectional view taken on line 4—4 of Figure 2.

As illustrated in the drawing, my novel fuel economizer comprises a cylindrical body member 10 which is mounted between the outlet tube 11 of a carburetor 12 and the intake manifold 13 of an internal combustion engine. It will be understood that the carburetor and intake manifold may be of any suitable construction. The body member 11 is secured to the carburetor and manifold by bolts 14 and screws 15, as illustrated in Figure 1. Gaskets 17 may, as shown in Figure 2, be provided in the assembly to facilitate a fluid tight connection. The outlet tube 11 may, as shown, be provided with the usual throttle valve 19 which, as illustrated, is of the butterfly type. The body member 10 is provided with a central opening 21 equal at its upper and lower ends to the bore 22 of the outlet tube and the bore 23 of the intake manifold respectively. The body member 10 may, as shown, be provided with flanges 24 and 25 at the upper and lower ends thereof, corresponding to the usual flanges 26 and 27 of the carburetor and intake manifold respectively.

Within the body member 10, intermediate the ends thereof, is an inwardly extending flange 28 which provides a restricted opening or passage 29 arranged substantially coaxially with the opening 21 and of considerably less diameter than said latter opening. Mounted beneath the flange 28 is a tube 30 of frusto-conical formation and which is provided with outwardly extending flanges 31 and 32 at the upper and lower ends thereof respectively. The flange 31 at the upper end of the tube 30 has contact with the lower face of the flange 28, while the lower flange 32 has engagement with the lower face of a second inwardly extending flange 34 provided in the body member 10 in inward spaced relation to the lower end thereof. The tube 30 may be fixedly secured to the body member 10 by any suitable means, such as screws 35 passing through suitable openings provided in the flange 32 and screw-threaded in the flange 34. The tube 30 is arranged, as shown in Figure 2, with the contracted or smaller end thereof adjacent the flange 28. The passage 37 through tube 30 is of substantially the same diameter at its upper end as that of the opening 29, and gradually increases in diameter toward the lower end of the tube where it is of considerably greater diameter than that of the restricted opening 29.

It will now be obvious that the inner wall of the body member 10 intermediate the flanges 28 and 34 and the tube 30 form an annular chamber 39 surrounding the tube 30. The proportions of the parts are such that the lower edge of the tube 30 forms part of the wall of the chamber 39, and this lower edge is provided with a multiplicity of relatively small apertures 40 communicating with the chamber 39. These apertures 40 are arranged in substantially uniform circumferential spaced relation to each other and are inclined with respect to the axis of the tube 30. That is, the axes of the apertures 40 extend downwardly and inwardly so that air passing therethrough is directed toward the center of the intake manifold opening 23 for mixing with the fuel and air mixture passing downwardly through the body member 10.

Connected with the body member 10 is a T- fitting 42 which has a duct 43 extending longitudinally therethrough. The fitting 42 is connected with the body member 10 so that the bore 43 is communication with the upper portion of the chamber 39. This fitting 42 is provided at its outer end with an enlarged portion 44 in which is mounted a spring actuated ball valve 45. The valve 45 is maintained against outward movement by an apertured plug 46 screw-threaded in the end 44. The inner end of the plug 46 has a conical surface adapted to be engaged by the ball to form a seat 47 therefor. The spring 48 for operating the valve 45 is positioned at the inner side of the valve and normally urges said valve to its seat. The tension of the spring 48 may be varied by screw-threading the plug 46 inwardly or outwardly with respect to the end 44. In this instance, the end 44 is exteriorly threaded for receiving a coupling member 50 which in turn supports a funnel 51. The coupling member 50 is provided with a small duct 53 which maintains the interior of the funnel 51 in communication with the aperture in the plug 46 for the admission of air therethrough. A screen 54 may, as shown, be provided in the funnel 51 for filtering the air as it passes through the funnel. The lateral extension 55 of fitting 42 has the outer end thereof provided with an enlarged bore 56 in which is mounted a spring actuated ball valve 57 similar to the valve 45. The valve 57 is maintained in the bore 56 by an apertured plug 58 screw-threaded in the outer end of the extension 55 and may, like the plug 46, be adjusted with respect to the extension for tensioning a spring 59 for valve 57. Screw-threaded on the outer end of the extension 55 is a pipe fitting 60 adapted to support a tube 61 which, as shown in Figure 2, is also supported by a second pipe fitting 63 having screw-threaded engagement with the outlet tube 11 of the carburetor 12 for maintaining the tube 61 in communication with the interior of the tube 11. As shown in Figure 2, the pipe fitting 63 is connected with the tube 11 at the carburetor side of the throttle valve 19 when said valve is in its closed position. It will now be understood that when the valve 57 is in an open position the interior of the outlet tube 11 is maintained in direct communication with the chamber 39 by the bore 43, a bore 55' provided in the extension 55 and tube 61.

It will be apparent from the foregoing that the openings 21 and 29 and passage 37 in the tube 30 provide a Venturi passage through the body member 10 for the fuel mixture passing from the carburetor to the engine. When the motor is operating, supplemental fluid is drawn from the chamber 39 through apertures 40 into the fuel stream passing through the Venturi passage. It will be understood that when the valve 45 and the valve 57 are both open, this supplemental fluid will consist in part of auxiliary air entering past the valve 45 and in part of fuel and air mixture from the carburetor entering past the valve 57. The supplemental fluid enters the fuel mixture stream substantially uniformly around the same, and the direction of the supplemental fluid is at an acute angle to the direction of flow of the fuel stream. Furthermore, the fluid passing through the apertures 40 enters the fuel stream below or at the engine side of the contracted portion or throat of the Venturi passage, and therefore at a time when the fuel stream is expanding. It will therefore be understood that the incoming supplemental fluid not only thoroughly mixes with the fuel passing from the carburetor, but also further breaks up or pulverizes the particles of the gasoline or other fuel used and thereby produces a gaseous fuel mixture of relatively high combustibility. Although the vacuum or subatmospheric pressure in the Venturi passage and the resulting suction in the chamber 39 may possibly be the greatest when the throttle valve 19 is closed, and the engine is idling, the quantity of auxiliary air entering the Venturi passage through apertures 40 may be controlled by proper tensioning of the valve springs 48 and 56, so that the engine will readily start and idle when cold.

The funnel 51 is preferably arranged to face the incoming cooling air stream for the engine. This arrangement of the funnel provides a super-charger means whereby air is forced to a limited degree into the chamber 39.

Figure 3:
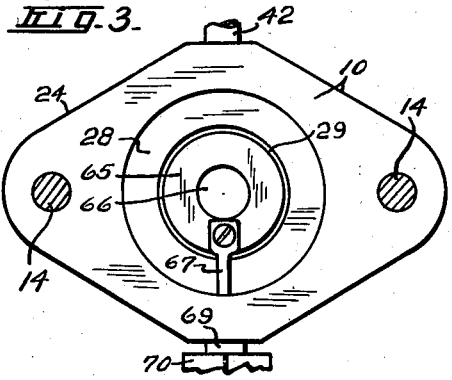
Figure 3 is a horizontal sectional view taken on line 3—3 of Figure 1.

In order that the operation of the engine may not exceed a predetermined speed, I have provided a simple and efficient governor means which is adapted to limit the quantity of fuel supplied to the engine. This governor means comprises a disk valve 65 located at the carburetor side of the opening 29 adjacent the throat of the Venturi passage through the body 10. This valve 65 is slightly less in diameter than the opening 29 so as to freely rotate with respect to said opening. The valve 65 is provided with a restricted opening 66 for the passage of a limited amount of fuel through said valve. Valve 65 is secured to an extension 67 of a spindle 68 which, in this instance, is rotatably mounted in a sleeve 69 screw-threaded in the side of the body member 10, as shown in Figure 2. Screw-threaded on the outer end of sleeve 69 is a collar 70 which extends outwardly beyond the sleeve 69 and has a recess 71 in the outer end thereof arranged coaxially with the spindle 69. The spindle 69 is provided with a reduced end portion 72 which extends outwardly through the opening or recess 71 and has secured thereto a pointer 73 adapted to register with spaced indicia 75 provided on the collar 70 for indicating the position of valve 65. The pointer 73 in this instance is secured to the spindle end 72 by nuts 76 and 77 screw-threaded on the end 72 and which provide means whereby the spindle may be manually rotated. The collar 70 may, as shown, be provided with a peripheral recess or groove 78 intermediate the ends thereof for receiving the lock bolt (not shown) of a suitable lock 79 indicated by broken lines in Figure 2, said lock being preferably designed so as to conceal the outer end of spindle 68 and the pointer 73, whereby an unauthorized person is prevented from changing the setting of valve 65. When the valve 65 is in the operative position it lies normal to the opening 29, as shown in full lines in Figures 2 and 3 for restricting the amount of fuel mixture passing from the carburetor to the intake manifold. When the valve is in the inoperative position, it is arranged edgewise substantially parallel with the axis of opening 29, as indicated by broken lines in Figure 2, so that a maximum quantity of fuel mixture may pass from the carburetor to the intake manifold.

Although I have shown and particularly described the preferred embodiment of my invention, I do not wish to be limited to the exact construction shown, as variation, both in the form and relation of the parts thereof, may readily be made without departing from the spirit of the invention as herein claimed.

I claim:

1. A fuel economizer adapted to be located beyond a carburetor for an internal combustion engine, comprising in combination, a central passage establishing communication between the outlet of the carburetor and the intake manifold of the engine, a chamber surrounding said central passage, a plurality of openings connecting said chamber with said central passage and so constructed and arranged that the flow of the fuel and air mixture through said central passage aspirates fluid through said openings into said central passage in jets impinging upon said fuel and air mixture and creates a suction in said chamber, a conduit connecting said chamber to the atmosphere, a normally closed valve in said conduit constructed to be opened responsive to the suction in said chamber, a second conduit connecting said chamber to the outlet of the carburetor, and a normally closed valve in said second conduit constructed to be opened responsive to the suction in said chamber, whereby said jets may be supplied in part with auxiliary air and in part with fuel and air mixture from the carburetor.

2. A fuel economizer adapted to be located beyond a carburetor for an internal combustion engine, comprising in combination, a central passage establishing communication between the posterior side of the throttle valve of the carburetor and the intake manifold of the engine, a chamber surrounding said central passage, a plurality of openings connecting said chamber with said central passage and so constructed and arranged that the flow of the fuel and air mixture through said central passage aspirates fluid through said openings into said central passage in jets impinging upon said fuel and air mixture and creates a suction in said chamber, a conduit connecting said chamber to the atmosphere, a normally closed valve in said conduit constructed to be opened responsive to the suction in said chamber, a second conduit connecting said chamber to the anterior side of the throttle valve, and a normally closed valve in said second conduit constructed to be opened responsive to the suction in said chamber, whereby said jets may be supplied in part with auxiliary air and in part with fuel and air mixture by-passing the throttle valve.

3. A fuel economizer adapted to be located beyond a carburetor for an internal combustion engine, comprising in combination, a central passage establishing communication between the posterior side of the throttle valve of the carburetor and the intake manifold of the engine, a Venturi throat in said central passage, an annular chamber surrounding said central passage adjacent said Venturi throat, a plurality of openings connecting said chamber with the posterior side of said Venturi throat and so constructed and arranged that the flow of the fuel and air mixture through said central passage aspirates fluid through said openings into said central passage in jets impinging upon said fuel and air mixture and creates a suction in said chamber, a conduit connecting said chamber to the atmosphere, a normally closed valve in said conduit constructed to be opened responsive to the suction in said chamber, a second conduit connecting said chamber to the anterior side of the throttle valve, and a normally closed valve in said second conduit constructed to be opened responsive to the suction in said chamber, whereby said jets may be supplied in part with auxiliary air and in part with fuel and air mixture by-passing the throttle valve and the Venturi throat.

4. The combination as claimed in claim 3 in which each of said normally closed valves is a spring-loaded valve the tension of which is adjustable.

JOHN ACOSTA.